United States Patent [19]
Trowbridge

[11] 3,765,355
[45] Oct. 16, 1973

[54] SALVAGE SYSTEM
[75] Inventor: Clifford F. Trowbridge, Pleasant Hill, Calif.
[73] Assignee: The United States of America as represented by the Secretary of the Navy, Washington, D.C.
[22] Filed: Feb. 4, 1972
[21] Appl. No.: 223,431

[52] U.S. Cl. .................................................. 114/51
[51] Int. Cl. ............................................. B63c 7/00
[58] Field of Search ................. 114/51, 44; 219/72, 219/98

[56] References Cited
UNITED STATES PATENTS

| | | | |
|---|---|---|---|
| 2,374,134 | 4/1945 | Richard | 114/51 |
| 3,489,878 | 1/1970 | Wieland | 219/98 |
| 3,354,856 | 11/1967 | Annibale | 114/51 |
| 3,033,149 | 5/1962 | Aschinger | 114/51 |
| 1,393,894 | 10/1921 | McGill | 114/51 |

Primary Examiner—Milton Buchler
Assistant Examiner—Gregory W. O'Connor
Attorney—Richard S. Sciascia et al.

[57] ABSTRACT

A marine salvage system is disclosed as including a carrier vehicle having a controllable manipulator arm to which is attached a carriage frame for carrying a plurality of unique self-striking, self-aligning welding electrode assemblies that facilitate the welding thereof to sunken underwater objects to be salvaged, so that they may be raised to the surface and transported to any desired place.

15 Claims, 5 Drawing Figures

SALVAGE SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates, in general, to salvage systems and, in particular, is a new and improved system for salvaging underwater objects of irregular or non-uniform surface or profile characteristics by effecting a unique attachment thereto and then lifting and carrying said objects to the water surface or other desired locations for further operation thereon. In even greater particularity, the subject invention incorporates an improved self-striking, self-aligning, stud-electrode, padeye attachment for connecting a lift means to an object to be lifted during salvage or other operations.

DESCRIPTION OF THE PRIOR ART

Heretofore, numerous methods and means have been employed for connecting lift and towing mechanisms to objects to be removed from various and sundry environments and situations for salvage or other purposes, including for underwater salvage purposes. For example, such things as hooks and grapples have been used. However, their use is limited to the situation where the object or device to be lifted has such structural configurations as will provide a place for the connection thereof therewith. In addition, such items as inflatable floats or pontoons have been attached to sunken objects and then inflated in such manner as to raise said object, say, to the surface of the water in which it had sunk. Of course, such items usually require that divers make the proper attachments thereof, and, thus, they are ordinarily limited in use to relatively shallow water operations. Moreover, some marine salvage operations make use of slings, cradles, or cradle-like cables which are inserted under the object to be raised and they are pulled up by means of motor driven winches, pulleys, and the like. Again, such devices are limited to diver-accessible situations, ordinarily in shallow water, and require such ancilliary equipment as ships, cranes, floats, etc.

All of the foregoing methods and means for raising objects, especially those located in water, are quite satisfactory for many practical purposes. However, for many other purposes, they leave something to be desired. Accordingly, the subject invention is exceedingly useful and constitutes an improvement over the prior art in many instances.

SUMMARY OF THE INVENTION

Briefly, the instant invention comprises a carrier vehicle having a manipulator mechanism for placing a connector on the outside surface of a non-uniform object to be lifted during salvage or other operations. After such placement thereby, sufficient electrical current is supplied to an electrode array included in said connector to cause the electrodes thereof to be welded securely to said object, after which it is disconnected from the manipulator mechanism and pulled to the water surface or other useful location by a suitable cable attached to a winch or an appropriate service vehicle, such as, for instance, a salvage ship, or the like.

As a result of the unique structural configuration of each electrode assembly in said electrode array, it becomes self-striking and self-aligning at the instant it impacts upon the surface of the object to be salvaged, thereby effecting an exceeding strong connection means for its particular size and weight. Hence, for many practical purposes, the subject invention overcomes most of the disadvantages of the prior art and, thus, constitutes an improvement thereover.

It is, therefore, an object of this invention to provide an improved object lifting system.

Another object of this invention is to provide an improved salvage system.

Still another object of this invention is to provide an improved method and means for attaching a lift device to an irregularly shaped object to be lifted.

A further object of this invention is to provide an improved method and means for connecting a manipulatable mechanism to an underwater object to be salvaged.

Another object of this invention is to provide a method and means for carrying an underwater object by a salvage vehicle, be it a submarine, a water surface vehicle, an aircraft, or any other type of salvage vehicle.

Another object of this invention is to provide an improved underwater salvage connector that is not adversely affected by a marine film or growth located on the object to be salvaged.

Still another object of this invention is to provide an improved underwater salvage attachment method and means that is effective without penetrating the object to be moved.

Another object of this invention is to provide a salvage connector that does not have a deleterious affect on the buoyancy of the object being salvaged.

A further object of this invention is to provide a method and means for capturing, holding, pulling, and lifting a marine vehicle or other object that has sunk in deep water, regardless of its external geometrical configuration.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENTS

Figure 1:
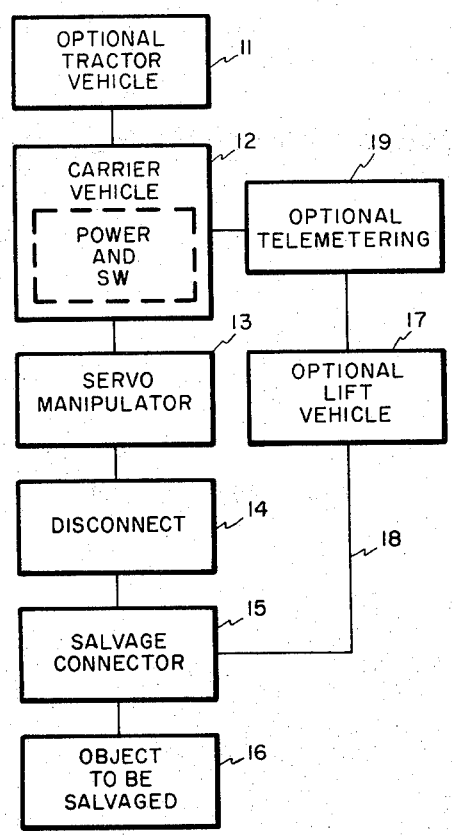
FIG. 1 is a block diagram which illustrates a generalized version of a salvage system incorporating the invention.

Referring now to FIG. 1, there is shown an optional tractor vehicle 11 which, if warranted by any given operational circumstances, is connected to a carrier vehicle 12 for the towing or otherwise providing the motive power thereof. Tractor vehicle 11 may, of course, be of any type that is suitable for the situation; hence, it may be a ship, a boat, a submarine boat, a helicopter, an airplane, or the like, or any appropriate land vehicle. Likewise, carrier vehicle 12 may be any suitable type, such as a crane, a boat, an underwater vehicle, or the like. Moreover, it may either be pushed or pulled by the aforesaid tractor vehicle 11 or, if preferred, it may be a self-contained and auto-motive vehicle which has its own power plant. In addition, it preferably includes such electrical power supplies, selector switches, and other controls necessary for versatile operation.

Carrier vehicle 12 also contains (or has connected thereto) a servo manipulator 13 of any conventional type that will allow it to position its outer extremity in accordance with the control signals supplied thereto by a human or other operator. Connected to the controlled end of manipulator 13 is a disconnect mechanism 14, which, in this particular instance, as will be disclosed subsequently, is a combination mechanical and electrical disconnect mechanism. It is, of course, of a type that is conventional in the art; therefore, it may be hydraulically, mechanically, electrically, or otherwise actuated, as desired.

Connected to disconnect mechanism 14 is a "padeye" salvage connector 15, which is the device that is constructed for being attached to and lift or otherwise move an object to be salvaged 16. Connector 15 will be discussed more fully below.

The preferred embodiment disclosed herewith includes an optional lift vehicle 17, which may be any suitable vehicle but is usually a salvage ship having power winches, cranes, and other salvage facilities located thereon. Through said winches, etc., lift vehicle 17 is connected by a cable 18 (mechanical and/or electrical) to the aforesaid connector 15, and it is by such means that the object to be salvaged 16 is raised to the surface of the water and perhaps towed to some more accessible location.

To provide communication between all of the aforementioned devices 11 through 17, an optional telemetering system 19 may be employed. For such purpose, telemetering system 19 is disclosed in a general manner as between lift vehicle 17 and carrier vehicle 12, but it should be understood that it may extend therethrough and, thus, be effectively connected to the other devices, as well.

In order to simplify and relate, insofar as it is possible, the particular elements of each of the drawing figures, like elements thereof will be identified (without limitation) by like reference numerals.

Figure 2:
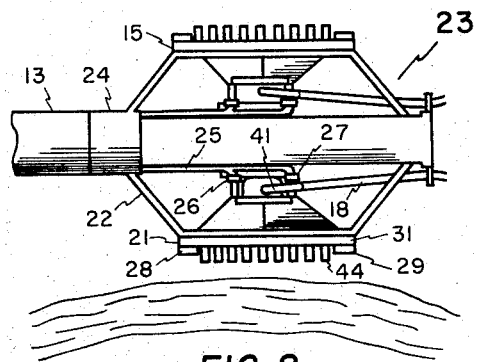
FIG. 2 is an elevational view of a plurality of podeye connectors combined with a manipulator-support assembly.

As suggested above, FIG. 2 depicts a pair of padeye connectors 15 and 21 supported by a frame 22 connected to the outer extremity 23 of the aforesaid manipulator 13. Although only two padeye connectors are included in this particular preferred embodiment, it should be understood that frame 22 may be so designed as to support any number thereof necessary for any given operational circumstances, since so doing would be well within the purview of the artisan having the benefit of the teachings presented herewith. Furthermore, because connectors 15 and 21 are identical, only connector 21 will be described in detail.

In order to turn either of the padeye connectors into position for attachment to the object to be salvaged, a rotary electrical power connector 24 is employed.

Thus, electrical power may be conducted through manipulator 13, through rotary power connector 21, and through cables 25 to electromechanical disconnect mechanisms 26 and 27, both of which were lumped together as disconnect 14 in the teaching of FIG. 1. Disconnect mechanisms 26 and 27 may be of any conventional type that, before actuation, securely holds padeye connector 21 within frame 22 and timely supplies electrical power to electrode and other components thereof. They may, for example, be operated hydraulically pneumatically, electrically, or mechanically, as operational circumstances dictate. In any event, as previously indicated, they securely attach their respective padeye connectors to frame 22, so as to facilitate the placement thereof against the object to be salvaged.

At preferably uniform locations around the periphery of connector 21 are mounted a plurality of permanent magnets of which magnets 28 and 29 are visible in FIG. 2. Said magnets should be strong enough to be attracted to the metal surface of the object to be salvaged, so that the entire padeye connector will be held thereagainst until a more secure attachment is made therebetween.

Figure 3:
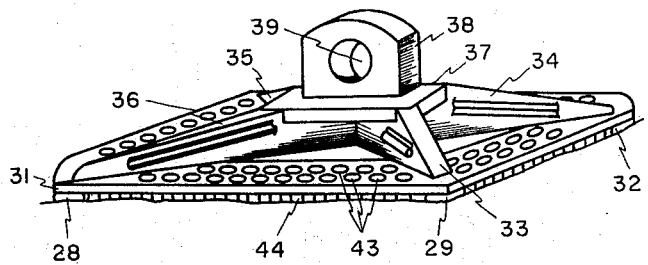
FIG. 3 is a perspective view of the padeye connector assembly of the invention.

As may best be seen in both FIGS. 2 and 3, padeye connector has a base plate 31 to which said magnets 28 and 29, as well as magnet 32, are attached by any conventional means. Base plate 31 has brackets 33 through 35 welded thereto for the support thereof. In this particular preferred embodiment of the invention, base plate 31 is shown as being square with an opening in the center; however, it may also be designed to have any other geometrical configuration and be solid, if so desired. Connected to the top of brackets 32 through 36 is an upper support pad 37, and connected thereto is a lift eye 38 with a hole 39 therethrough for insertion of a bridal portion 31 of a tow or lift cable 18 therein.

At this time, it should perhaps be understood that all of the connections between structural elements of the entire invention are well known and conventional, per se. Hence, they may, for example, be made by welding, bolting, riviting, or any other appropriate means. Of course, detailed disclosures of such connections have not been illustrated, other than showing that they do exist and, thus, the respective components of the invention are properly assembled together.

Located through base plate 31 is a plurality of aperatures or holes 43 in which is disposed a like plurality of universally jointed electrode assemblies 44, respectively. Each of said electrode assemblies is constructed as shown in FIG. 4, and, of course, each thereof constitutes a very important part of the invention.

Figure 4:
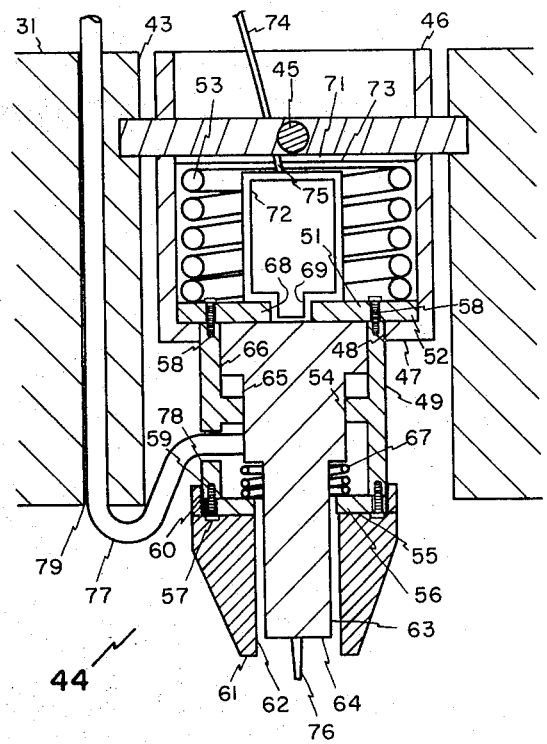
FIG. 4 is a cross-sectional view of an electrode assembly of the type included in the array thereof in the connector assemblies of FIGS. 2 and 3.

Referring now to FIG. 4, as shown therein, electrode assembly 44 is depicted schematically as having a two-degree-of-freedom gimbal assembly 45 which is mounted in one of the aforesaid holes 43 in base plate 31. Connected to the inner ring of gimbal assembly 45 is a sleeve 46, which extends downwardly and has a capped end 47 with a hole 48 therein at the bottom thereof. Slidably mounted in the hole or opening of the bottom of sleeve 46 is a hollow cylinder 49. Cylinder 49 has an upper end cap 51 with a flanged portion 52 extending from the periphery thereof, said flanged portion 52 being of such dimension as to be slidably compatible with the inside diameter of sleeve 46 and act as an abutment stop with the upper side of capped end 47. Disposed between the lower end of the inner ring of gimbal 45 and the upper end of cylinder 49 is a coil spring 53 which casues cylinder 49 to be urged downwardly in such manner that flange 52 is against end cap 47.

Located approximately midway along the length of cylinder 49 is an inner guide 54, which extends around the entire inside circumference thereof, and at the lower end thereof is a cap 55 with a center hole 56 therethrough. For assembly and disassembly purposes, end cap 55 may be bolted by bolts 57 or otherwise suitably connected to the lower end of cylinder 49 and upper end cap 51 may be connected to cylinder 49 by bolts 58, if so desired. The bottom end of cylinder 40 contains screw threads 59, and screwed on said threads by means of internal threads 60 is an electrically non-conductive ceramic clearance ring or frustro-conical cone 61 which has a hole 62 extending therethrough along the longitudinal axis thereof.

Disposed within cylinder 49 is a welding electrode 63. Said electrode has a lower section 64 of such diameter to slidably pass through hole 62 in cone 61, and it has a larger intermediate section 65 of such diameter as will provide a slip fit between it and the inside diameter of the aforesaid cylinder guide 54. An even larger section 66 thereof is located within the top of cylinder 49 in such manner that it is slidable therein. Of course, as readily may be seen, the length of said larger section is such that electrode 63 has sufficient play within cylinder 49 that it can move up and down therein but be stopped by the lower side of upper end cap 51 and the upper side of guide 54. Disposed between the lower surface of intermediate section 65 of electrode 63 and the upper surface of lower end cap 55 is a helical coil spring 67, the coils of which surround lower section 64 of electrode 63.

The upper end cap 51 of cylinder 49 contains a hole 68, and extending therethrough is a lower discharge portion 69 of an explosive cartridge assembly 71, the upper charge portion 72 of which is located within the helical coils of the aforementioned spring 53. The upper surface of cartridge 71 is disposed in abutment with the underside of a wall 73 located in sleeve 46 which acts as a breech block therefor during the firing thereof.

Cartridge 71 is preferably fired electrically and, thus, has electrical leads 74 connected thereto. For this purpose leads 74 extend through a hole 75 in wall 73 and are connected to suitable power supply and switching apparatus aboard carrier vehicle 12, or elsewhere as appropriate. At the lower extremity of stud electrode 63 is attached a small, pointed, consumable arc-striking electrode 76, the point of which is the first part of the electrode assembly to contact the surface of the object to be salvaged.

To provide large electrical current to welding electrode 63, a heavy duty, insulated wire conductor 77 is connected thereto. It passes through a suitable hole 78 in the wall of cylinder 49 and a hole 79 in base plate 31 in order for the other end thereof to be connected to suitable switching mechanisms and power supplies (not shown), preferably located in the aforesaid carrier vehicle 12 and perhaps controlled by suitable control instrumentation (likewise not shown) in optional lift vehicle 17.

Figure 5:
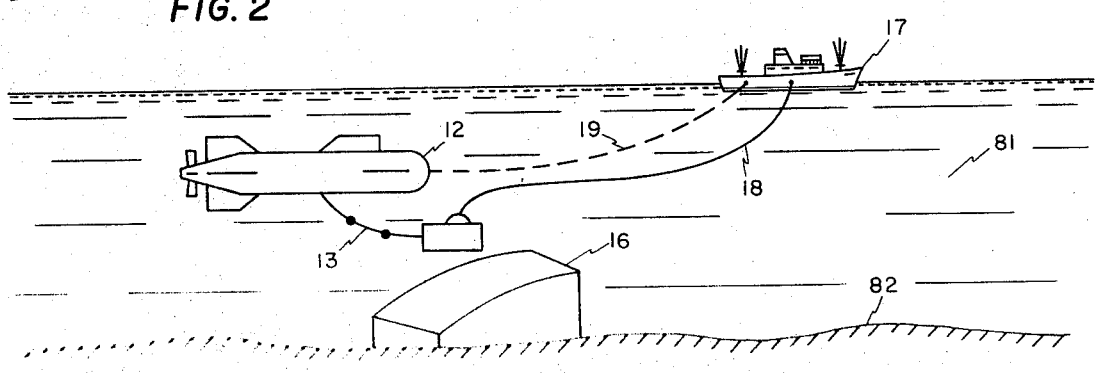
FIG. 5 is a quasi-pictorial view of the invention in operation.

FIG. 5 illustrates an exemplary operational arrangement of a system incorporating the instant invention. It is herewith employed to insure that it is understood that at least one embodiment thereof is useful for its intended purpose. Hence, it should be considered that the invention is not limited thereto. Again, reference numerals previously used will be employed to indicate like elements, components, and devices. Thus, shown therein is optional lift vehicle 17 portrayed as a ship 17 which optionally tows by means of a combination telemetering tow cable 19 a carrier vehicle 12. Again, it should be understood that vehicle 12 may be self-propelled, it so desired; and moreover, that ship 17 and telemetering 19 may not be required, especially if vehicle 12 is completely self-sufficient.

Carrier vehicle 12 includes a conventional controllable manipulator mechanism 13 which is capable of deploying salvage connector 21 in any position necessary for contact with object 16 to be salvaged, and connector 15 is connected via cable 18 to ship 17 so that it may be raised thereby.

Because this particular salvage illustration is a marine salvage operation, the environmental medium in which the invention is working is water 81. Of course, water 81 may be fresh water, brackish water, sea water, or any other kind of water found in rivers, bays, estuaries, lakes, seas, and oceans. Accordingly, ship 17 is sailing thereon, vehicle 12 is shown as a submarine vehicle traveling therein, and object 16 to be salvaged is depicted as laying on the bottom or floor 82 thereof.

Obviously, if the subject invention were being used on land, in space, or within any other ambient work environment, the various and sundry vehicles and apparatus associated therewith would have to be designed for operation therein and substituted for those shown in FIG. 5. Again, so doing would be well within the purview of one skilled in the art having the benefit of the teachings presented herewith, inasmuch as so doing would not violate the spirit and scope of the invention.

MODE OF OPERATION

The operation of the invention will now be discussed briefly in conjunction with FIGS. 2 through 5.

At the outset, it should be understood that because welding techniques are being employed by this invention, the object to be salvaged must be of such material as can be welded. Preferably, it would be iron, steel, or the like, but by the proper selection of materials for the aforementioned electrodes, it could be other materials as well. For the purpose of keeping this disclosure as simple as possible, it will be considered as being iron and, thus, suitable welding electrodes and electric currents are used for such welding purposes.

Furthermore, although the invention is primarily intended for making a welded connection to a curved or irregular surface, it will work equally well with smooth, flat surfaces, too.

One of the advantages of the invention, as previously suggested, is that it is operable for salvaging ships, submarine boats, and other marine vehicles in the deep waters of the oceans. When being so used, carrier vehicle 12 may or may not be manned but at very great water depths is preferably unmanned and is, thus, controlled by the telemetering connection with ship 17. In any event, vehicle 12 is steered to sunken object 16, as a result of proper manipulation thereof, and connector 15 is made to contact an outer surface thereof. Being iron, object 16 is attracted to permanent magnets 28, 29, 30, and any others disposed around the rim of base 31, and, hence, padeye connector 21 is held securely in contact with object 16. However, at the time of actual impact of connector 21 on object 16, electrode assemblies 44 automatically attempt to align themselves normal to the surface contacted as a result of their being gimbaled with two-degrees-of-freedom and as a result of the lower surfaces of cones 61 aligning themselves with the surface of object 16 at all contact points, respectively. Alignment of the electrode assemblies is facilitated further by the resilience of spring 53, inasmuch as it not only effectively provides a shock absorbing cushion during impact, it also provides for greater total movement of the electrode in still another direction, a direction not provided by gimbal assembly 45. Then, electrical power is supplied to cartridge 71, causing it to detonate and force electrode point 76 into contact with object 16, thereby, in turn, causing a welding arc to be struck, since electric current is being supplied at the same time to electrodes 63 by electrical leads 77 and the power supply and switching apparatus (not shown) connected to the other end thereof.

From the foregoing, it may readily be seen that all of the stud electrodes are self-aligning and self-striking and, therefore, they adjust to and are welded to the surface contacted with a weld of considerable strength, regardless of the surface irregularities thereof. Furthermore, as previously suggested, because most marine growth, if any, present on the surface of the object to be salvaged will be penetrated and burned through, even though in some instances the joint efficiency of the welds must be lowered - say, to as low as 10 percent - in order to allow for severe porosity and inclusions, the lift capabilities (that is, the strength) of the welds remain very high.

Once the welds are effected, the disconnect mechanism 14 is actuated and the padeye connector is separated from its carriage frame 22. Ship 17 then reels in cable 18, thereby raising object 16 into a desired position, so that other operations may be performed thereon, as circumstances warrant.

As previously mentioned, the carriage at the end of the manipulator may be made to hold any number of salvage connectors merely by designing it therefor. Hence, large or small salvage operations may be implemented by using this invention, without requiring large numbers of support vehicles to be employed.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. In a salvage system, a padeye salvage connector, capable of being welded to an object having an irregular surface, for effecting the movement thereof to a desired location, comprising in combination:

a plurality of universally-jointed, self-aligning, self-striking welding electrode means, each of which is spatially disposed from the others and each of which is constructed for resiliently impeded movement in a direction away from and substantially normal to the surface of an object to which it is intended to be welded upon contact therewith, thereby effecting an irregular contact disposition thereof that is substantially compatible with the aforesaid surface regardless of its irregularities;

means connected to said plurality of universally jointed, self-aligning, self-striking, welding electrode means for the support thereof in a predetermined geometrical configuration; and means connected to said last mentioned support means for attaching a lifting means thereto.

2. The invention of claim 1 further characterized by at least one permanent magnet connected to said at least one salvage connector in such manner as to be attracted to the irregular surface of the object to be salvaged immediately prior to and during the welding of said electrode means thereto.

3. In a salvage system, a connector, comprising in combination:

a base plate having at least a first hole therethrough;

a gimbal means connected to said base plate in such manner as to be disposed within said first hole;

a sleeve connected to said gimbal means in such manner as to extend within two-degrees-of-freedom within said hole;

a first end cap, having a second hole therein, connected to one end of said sleeve;

a cylinder, having a second end cap at one end thereof with a third hole therethrough and a third end cap at the other end thereof with a fourth hole therethrough, slidably mounted within said second hole of said sleeve in such manner that the second end cap thereof is capble of making an abutting stop with said first end cap;

first resilient means effectively connected between said gimbal means and said second end cap of said cylinder for urging said second end cap into abutment with the aforesaid first end cap of said sleeve;

a welding electrode slidably mounted within said cylinder and extending through the fourth hole in the third end cap thereof;

second resilient means connected between said welding electrode and said third end cap of said cylinder for urging one end of said welding electrode into abutment with the second end cap thereof;

an electrically non-conductive ring effectively connected to and extending from the end of said cylinder in such manner as to surround the aforesaid welding electrode and normally extend beyond the end thereof; and means connected to said welding electrode for supplying electrical current thereto.

4. The connector of claim 3, wherein said electrically nonconductive ring is a ceramic ring having a frustoconical configuration.

5. The invention of claim 3, further characterized by a striker electrode integrally connected to the end of said welding electrode in such manner as to extend beyond the end of the aforesaid electrically nonconductive ring.

6. The invention of claim 3, further characterized by:

an explosive charge disposed within the aforesaid sleeve and extending through the second hole in said first end cap thereof in such manner that one end thereof is continuously disposed within the end of said welding electrode that is opposite the end thereof extending within said electrically non-conductive ring; and means connected to said explosive charge for timely effecting the detonation thereof.

7. A salvage system, comprising in combination:
- a carrier vehicle, said carrier vehicle including a power supply and a switching means therefor that is set in response to a first predetermined signal;
- a controllable manipulator means effectively connected to said carrier vehicle and extending therefrom into the environmental medium ambient thereto, said controllable manipulator means being adapted for movement in response to a second predetermined signal;
- a carrier frame means effectively connected to the outer extremity of said controllable manipulator means located within said ambient environmental medium;
- at least one salvage connector detachably connected to said carrier frame means, said salvage connector including a base plate having at least a first hole therethrough; a gimbal means connected to said base plate in such manner as to be disposed within said first hole; a sleeve connected to said gimbal means in such manner as to extend within two-degrees-of-freedom within said hole; a first end cap, having a second hole therein, connected to one end of said sleeve; a cylinder, having a second end cap at one end thereof with a third hole therethrough and a third end cap at the other end thereof with a fourth hole therethrough, slidably mounted within said second hole of said sleeve in such manner that the second end cap thereof is capable of making an abutting stop with said first end cap; first resilient means effectively connected between said gimbal means and said second end cap of said cylinder for urging said second end cap into abutment with the aforesaid first end cap of said sleeve; a welding electrode slidably mounted within said cylinder and extending through the fourth hole in the third end cap of said cylinder; second resilient means connected between said welding electrode and said third end cap of said cylinder for urging one end of said welding electrode into abutment with the second end cap thereof; an electrically non-conductive ring effectively connected to and extending from the end of said cylinder in such manner as to surround the aforesaid welding electrode and normally extend beyond the end thereof; and means connected between said welding electrode and the aforesaid switching means for enabling electrical current to be supplied thereto;
- means connected between said carrier frame means and the aforesaid salvage connector for effecting the disconnection thereof in response to a third predetermined signal; and
- means connected to said salvage connector for the moving thereof to a predetermined location after it has been disconnected from the aforesaid carrier frame means.

8. The device of claim 7, wherein said means connected to said salvage connector for the moving thereof to a predetermined location after it has been disconnected from the aforesaid carrier frame comprises:
- a lift vehicle; and
- a cable connected between said lift vehicle and the aforesaid salvage connector.

9. The device of claim 7, wherein said means connected to said salvage connector for the moving thereof to a predetermined location after it has been disconnected from the aforesaid frame means comprises:
- a cable having a bridle connected to said salvage connector; and
- a lift vehicle connected to said cable.

10. The invention of claim 7, further comprising means connected to said carrier vehicle for the movement thereof to a predetermined location.

11. The device of claim 10, wherein said means connected to said carrier vehicle for the movement thereof to a predetermined location comprises:
- a tractor vehicle; and
- force communicating linkage means connected between said tractor vehicle and said carrier vehicle.

12. The device of claim 10, wherein said means connected to said carrier vehicle for the movement thereof to a predetermined location comprises an auto-motive power plant contained within said carrier vehicle.

13. The device of claim 7, wherein said electrically non-conductive ring is a ceramic ring having a frusto-conical configuration.

14. The invention of claim 7, further characterized by a striker electrode integrally connected to the end of said welding electrode in such manner as to extend beyond the end of the aforesaid electrically non-conductive ring.

15. The invention of claim 7, further characterized by:
- an explosive charge disposed within the aforesaid sleeve and extending through the second hole in the first end cap thereof in such manner that one end thereof is contiguously disposed with the end of said welding electrode that is opposite the end thereof extending within said electrically non-conductive ring; and
- means connected to said explosive charge for timely effecting the detonation thereof.

* * * * *